United States Patent
Wagner et al.

(10) Patent No.: US 6,437,528 B1
(45) Date of Patent: Aug. 20, 2002

(54) METHOD FOR STANDARDIZING THE PANE POSITION OF A VEHICLE WINDOW LIFTER ACTUATED BY EXTERNAL FORCE

(75) Inventors: Klaus Wagner, Untermerzbach; Michael Giersch, Schwurzenbach am Wald, both of (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 0 days.

(21) Appl. No.: 09/561,702

(22) Filed: May 1, 2000

(30) Foreign Application Priority Data

Apr. 30, 1999 (DE) .......................................... 199 21 092

(51) Int. Cl.⁷ ................................................ H02P 7/00
(52) U.S. Cl. ...................... 318/282; 318/456; 318/461; 318/280; 318/466; 318/468; 318/286; 49/26; 49/28
(58) Field of Search ................... 318/280, 282, 318/286, 466, 468, 456, 461; 49/26, 27, 28

(56) References Cited

U.S. PATENT DOCUMENTS

| 4,468,596 A | * | 8/1984 | Kinzl et al. ................... 318/287 |
| 4,641,067 A | | 2/1987 | Iizawa et al. ................. 318/287 |
| 5,293,104 A | * | 3/1994 | Dreier ........................... 318/280 |
| 5,436,539 A | | 7/1995 | Wrenbeck et al. ........... 318/265 |
| 5,521,474 A | | 5/1996 | Hahn ............................ 318/285 |
| 5,530,329 A | * | 6/1996 | Shigematsu et al. ......... 318/469 |
| 5,539,290 A | | 7/1996 | Lu et al. ....................... 318/565 |
| 5,543,692 A | | 8/1996 | Howie et al. ................. 318/282 |
| 5,564,230 A | * | 10/1996 | Periou ........................... 49/349 |
| 5,592,060 A | * | 1/1997 | Racine et al. ................ 318/469 |
| 5,610,484 A | | 3/1997 | Georgin ........................ 318/286 |
| 5,689,160 A | | 11/1997 | Shigematsu et al. ......... 318/281 |
| 5,801,501 A | * | 9/1998 | Redelberger ................. 318/283 |
| 5,982,124 A | * | 11/1999 | Wang ............................ 318/466 |
| 6,043,620 A | * | 3/2000 | Koestler ....................... 318/282 |
| 6,208,101 B1 | * | 3/2001 | Seeberger et al. ........... 318/466 |

FOREIGN PATENT DOCUMENTS

| DE | 29 02 683 | 1/1979 |
| DE | 3034118 | 3/1982 |
| DE | 35 32 078 | 4/1986 |
| DE | 196 28 203 C1 | 1/1998 |
| EP | 0 468 361 | 1/1992 |
| GB | 2 206 723 | 2/1980 |

* cited by examiner

Primary Examiner—Robert E. Nappi
Assistant Examiner—Rina I. Duda
(74) Attorney, Agent, or Firm—Christie, Parker & Hale, LLP

(57) ABSTRACT

The invention relates to a method for standardizing the pane position of an external force actuated vehicle window lifter wherein the window pane is moved by means of the drive of the window lifter into a closed position provided with a seal and this closed position is used to standardize the pane position. According to the invention, in order to check whether the window pane has reached its closed position, the change is evaluated in a value (T) correlated with the dynamics of the window pane as the window pane enters into the seal area associated with the closed position.

9 Claims, 3 Drawing Sheets

METHOD FOR STANDARDIZING THE PANE POSITION OF A VEHICLE WINDOW LIFTER ACTUATED BY EXTERNAL FORCE

CROSS-REFERENCE

This application claims priority of German Application No. 199 21 092.6-23 filed Apr. 30, 1999, a copy of which is Attachment A hereto, the disclosure of which is incorporated fully herein by reference.

FIELD OF THE INVENTION

The invention relates to a method for standardizing the pane position of an external force actuated vehicle window lifter.

BACKGROUND OF THE INVENTION

Standardizing the pane position is of particular importance in the case of vehicle window lifters which are fitted with a device for detecting a jammed object. With these window lifters the drive is automatically switched off and where necessary reversed when the window pane during its upward movement strikes an obstruction which would otherwise be clamped between the upper edge of the pane and the window frame.

However there is a problem here in that the movement of the window pane into the upper pane seal could be interpreted as a jamming case on account of the resistance exerted by the pane seal against the displacement movement of the window pane. The window lifter would then be automatically switched off and the window pane could not then be moved completely into the upper pane seal. To solve this problem various proposals have been put forward in order to deactivate the anti-jam protection as the window pane enters into the upper pane seal, see here DE 196 28 203 C1. However in order to be able to do this it is necessary to determine accurately the relevant position of the window pane during its displacement movement.

For these reasons it is customary prior to initially operating an external force actuated window lifter or even after its repair to move the window pane once into its closed position in order to standardize the pane position. This upper end position of the window pane then serves as a zero or reference position for the window pane, in relation to which all individual displaced positions of the window pane can be determined along its displacement path.

In view of the importance of standardizing the pane position for a satisfactory functioning of an anti-jam protection system and furthermore in general for a reliable detection of the actual position of a displaceable window pane it is absolutely crucial to eliminate faults as far as possible when standardizing the pane position. For faults in the standardizing of the pane position can lead for example to a jamming case which occurs as the window pane is raised being misinterpreted by the anti-jam protection system as the window pane moving into the upper pane seal. The result of this would be that the drive of the window lifter is not switched off but rather is operated further with an increased current supply so that the resistance of the supposed pane seal can be overcome. This can lead to serious injury particularly in the case where part of the body is jammed.

SUMMARY OF THE INVENTION

The object of the invention is to provide a method for standardizing the pane position of a window lifter wherein a faulty standardizing of the pane position is reliably eliminated as far as possible.

According to this in order to check whether the window pane during standardizing has properly reached its upper end position (closed position), the change is evaluated in a value correlated with the dynamics of the window pane as the window pane enters into the seal area associated with the closed position.

The invention is based on the knowledge that the dynamics of the window pane when entering into the pane seal associated with the closed position is influenced in a characteristic way. Therefore by taking into account the dynamics of the window pane it can be readily checked whether the window pane has actually properly entered into the upper sealing area. More particularly it can be reliably established whether during standardizing of the pane position the entrance of the window pane into the closed position is prevented through a faulty fitting of the window lifter or through an object jammed between the window pane and the seal area. In the latter case the end position reached during standardizing the pane position is recognised as a position not corresponding to the actual closed position and therefore is not used consequently as the reference or zero point position of the window pane.

The failed standardizing can be indicated through an optical or acoustic signal. Furthermore after a failed standardizing the automatic function of the external force actuated window lifter is not activated, that is for as long as no proper standardizing of the pane position has been completed the window lifter cannot be moved automatically into its upper end position.

In particular the period length or speed of the drive (or of a displacement element connected with the drive, such as for example a gear part of the window lifter or the window pane itself), the current collection of the drive or the change of speed (acceleration) or change of current collection, can all be considered as values correlated with the dynamics of the window pane which can be used to check whether the window pane has reached its end position in the upper seal area. Basically when carrying out the method according to the invention any value can be used which reflects the influence of the upper pane seal on the dynamics of the window pane.

The entrance of the window pane into the seal area can be detected in particular from a local extremum of the value correlated with the dynamics, preferably the speed or period length, in dependence on the displacement site of the window pane. Thus when the window pane enters into the seal area there is normally at first a drop in the speed or an increase in the period length of the drive. After the window pane has moved by its leading upper edge a little further into the seal area however and has thereby overcome the resistance of the sealing lip of the seal area pressing against the window pane, a certain increase in the speed or decrease in the period length of the drive occurs again. A local minimum or local maximum respectively is hereby formed in the path of the speed or of the period length of the drive over the displacement path of the window pane. This is typical for the upper edge of the window pane entering into the seal area and can thus be used as a typical criterion for reaching the closed position of the window pane. If however the window pane during standardizing strikes an obstruction by its leading edge then the speed is decreased or the period length increased substantially continuously. It does not result in forming an extremum. The entrance into the seal area can thereby be clearly differentiated from striking an obstruction of another kind.

When evaluating the value correlated with the dynamics of the window pane not only should the actual displacement position of the window pane be used, but also where applicable some pre-values of the value correlated with the dynamics of the window pane. This prevents the result of the evaluation from being falsified by environmental factors, wear etc.

In a preferred embodiment of the invention the standardizing of the pane position is interrupted when after a predeterminable time span no path of the value correlated with the dynamics of the window pane has been observed which is characteristic of the entrance of the window pane into the seal area. This then signifies that during standardizing of the window pane no proper displacement movement of the window pane is taking place and thus a reliable standardizing of the pane position cannot be carried out.

Furthermore standardizing the pane position is preferably then only carried out when the window pane has moved at least along a path length which is greater than the extension of the pane seal in the direction of movement of the window pane. For only in such a case is it ensured that the characteristic behaviour of the value correlated with the dynamics of the window pane which appears as the leading edge of the window pane enters into the seal area can actually be observed. Advantageously the minimum displacement path of the window pane is thereby selected slightly larger than the extension of the seal area in order to ensure that the window pane when entering the seal area has already reached its usual displacement speed (swung-in system state).

BRIEF DESCRIPTION OF THE DRAWINGS

Further advantages of the invention will now be explained in further detail with reference to the embodiments shown in the drawings in which.

DETAILED DESCRIPTION

Figure 1A:
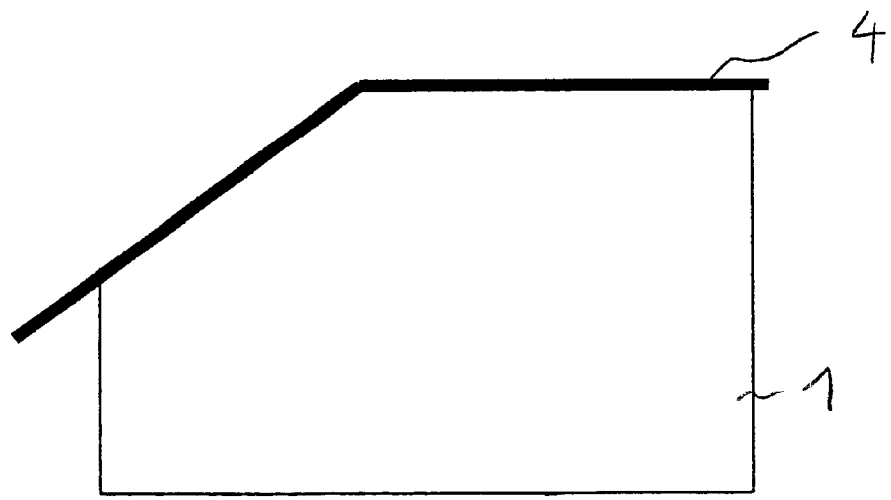
FIG. 1a shows a window pane moved into its upper end position (closed position) for standardizing the pane position.

FIG. 1a shows a window pane 1 which is adjustable by an external force actuated window lifter and which to standardize the pane position has been moved by its leading edge into a seal area 4 in its upper end position (closed position).

Figure 1B:
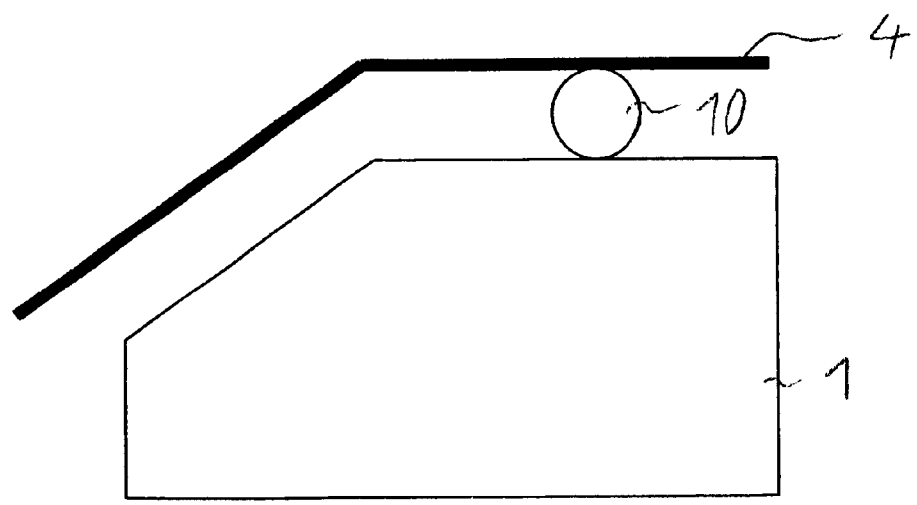
FIG. 1b shows a window pane which has moved against an obstruction during standardizing of the pane position.

FIG. 1b shows the same window pane 1 which here during lifting for the purpose of standardizing the pane position has moved against an obstruction 10 which has thus been jammed between the leading edge of the window pane 1 and the upper seal area 4.

Since the entrance of the window pane 1 into the upper seal area 4 for the purpose of standardizing the pane position serves to establish a reference position of the window pane, to which during further operation of the window lifter each displaced position of the window pane 1 is related, in the embodiment according to FIG. 1b the result is a faulty standardizing of the pane position. For the control or electronics unit of the window lifter serving to displace the window pane 1 the position illustrated in FIG. 1b would be erroneously interpreted as the closed position of the window pane 1. With a window lifter provided with an anti-jam protection system this means that in the automatic operation of the window lifter during raising of the window pane 1 the anti-jam protection system would be deactivated too early to ensure the proper entrance of the window pane 1 into the upper seal area. There is then the danger that a part of the body could be clamped between the leading edge of the window pane and the seal area 4, thus resulting in injuries which are exactly to be eliminated by an anti-jam protection system.

Figure 2A:
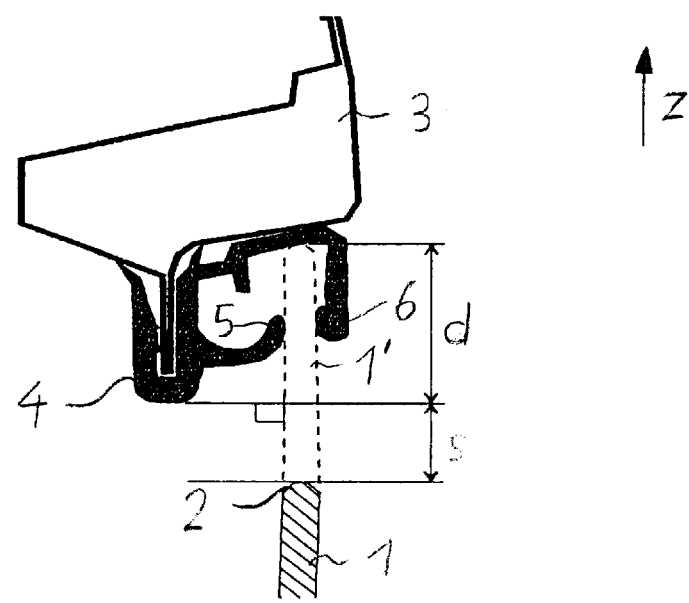
FIG. 2a shows the leading edge of a window pane as it enters into the upper seal area.

FIG. 2a shows the leading edge 2 of a window pane 1 which is about to move along its displacement direction z into the upper seal area 4 fixed on the vehicle body 3. The window pane is hereby located at a distance d+s from its closed position which corresponds to the extension d of the seal area 4 along the displacement direction z of the window pane including a distance s. This distance s corresponds to the smallest possible extension of an obstruction along the displacement path z which can still cause a jamming case, thus for example the thickness of the finger of a small child.

If this window pane 1 is moved up further along the displacement direction z then its leading edge 2 passes into the seal area 4 where the sealing lips 5, 6 of the seal area 4 press on both sides against the side faces of the window pane 1 so that the displacement speed of the window pane is reduced until it finally reaches its upper end position (closed position), which is shown in dotted lines in FIG. 2a and is marked by reference number 1'.

Measurements have now shown that when the leading edge 2 of the window pane 1 enters the seal area 4 the result is not a continuous drop in the speed of the window pane. Rather at first a characteristic drop in the displacement speed of the window pane 1 is observed, and thus also in the speed of the drive motor of the window lifter, when the leading edge 2 of the window pane reaches the sealing lips 5, 6. After the resistance of these sealing lips 5, 6 has been overcome the speed of the window pane then increases once again for a short while until it is completely braked on reaching its closed position.

Figure 2B:
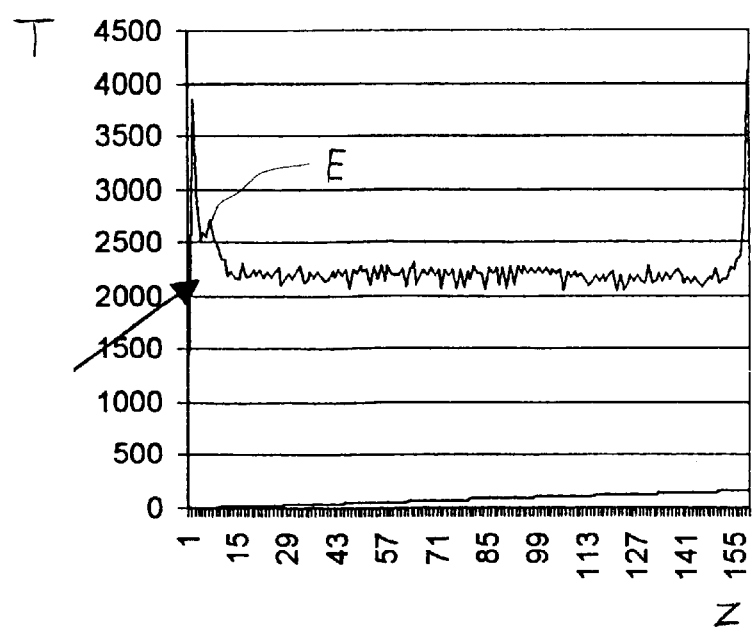
FIG. 2b shows the period length of the displacement drive of the window lifter in dependence on the displacement site, more particularly in the area of the upper pane seal.

This characteristic behaviour of the window pane as it enters into the seal is shown in FIG. 2b where the period length of the drive is shown over the displacement site of the window pane. The displacement site z of the window pane is thereby defined so that the variable z is greater the further away the leading edge 2 of the window pane 1 is from the upper end position (closed position) of the window pane 1. It can be clearly seen that as the window pane enters into the seal area an extremum E (additionally marked in FIG. 2b by an arrow) is formed in the path of the period length T of the drive over the displacement site z of the window pane. From this extremum it is possible to establish that the window pane 1 has actually entered into the seal area 4. Alternatively however a characteristic rise of the period length T immediately prior to reaching the extremum could be used here.

Obviously instead of the period length T it is also possible to enter the speed over the displacement site z. In this case instead of a local maximum (as can be seen in FIG. 2b) a local minimum would be formed in the path of the speed over the displacement site z. It would correspondingly result in a characteristic drop in the speed prior to reaching the local minimum.

Figure 3A:
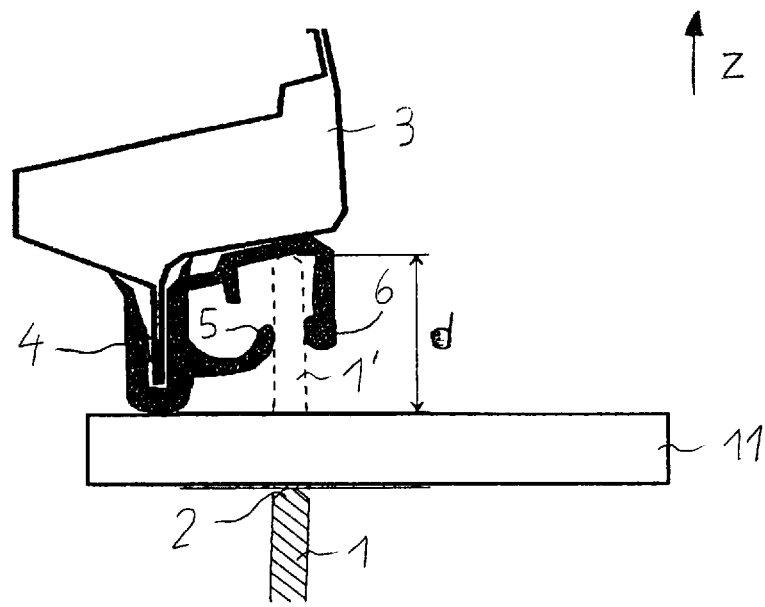
FIG. 3a shows the leading edge of the window pane running up against an obstruction during the raising of the window pane for the purpose of standardizing the pane position.

FIG. 3a shows the case where the leading edge 2 of the window pane 1 runs up against an obstruction 11 prior to reaching the pane seal 4 fixed on the vehicle body 3 and more particularly the sealing lips 5, 6 thereof. In this case the window pane 1 can thus not reach its closed position which is shown in dotted lines in FIG. 3a and is marked by the reference numeral 1'.

Figure 3B:
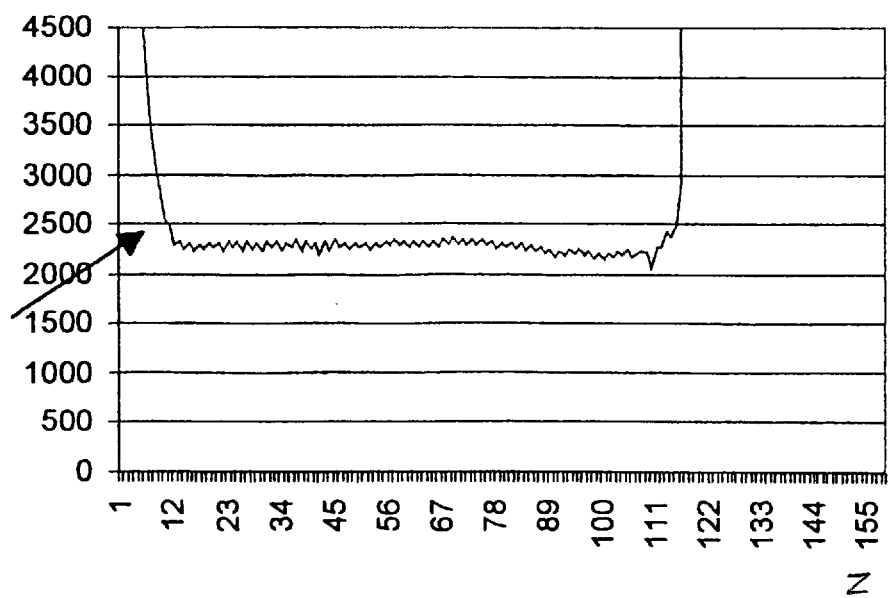
FIG. 3b shows the path of the period length of the drive of the window lifter in dependence on the displacement site, more particularly when moving against an obstruction.

FIG. 3b, in which the period length T of the drive is entered over the displacement site z of the window pane shows that in this case the change in the period length T takes a quite different course from that during the proper entrance of the window pane into the upper seal area as shown in FIGS. 2a and 2b.

From FIG. 3b it can be seen in particular that the movement of the leading edge 2 of the window pane 1 against the obstruction 11 leads to a continuous sharp rise in the period length T (in FIG. 3b marked by an arrow). A local extremum of the period length T is not hereby formed, and also the type of rise of the period length T is quite different from that when the pane enters the upper seal area. By evaluating the period length T of the drive of the window pane it is thus possible to reliably establish whether the window pane during standardizing of its pane position has actually reached its closed position in the upper seal area or whether it has moved against an obstruction during standardizing. In the latter case standardizing is interrupted as unsuccessful. An automatic raising of the window pane (e.g. by means of a single activation of a corresponding control element of the window lifter) is then prevented through a suitable programming of the control electronics of the window lifter. Only when a successful standardizing of the pane position has been carried out does the automatic raising of the window pane through the control electronics become possible.

With regard to the significance of this monitoring of the standardizing of the pane position for the reliable functioning of an anti-jam protection system, reference is made to the comments on this in the introductory discussion on the patent claims in order to avoid repetition here.

What is claimed is:

1. A method for standardizing a pane position of a window pane of an external force actuated vehicle window lifter having a drive, wherein the window pane is moveable by the drive of the window lifter into a closed position in a seal area, the method comprising:

identifying a characteristic change in a changing value correlated with the dynamics of the window pane entering a sealing area that is different than a change in the changing value of the window pane striking an object prior to reaching the sealing area;

moving the window pane toward the closed position;

evaluating a change in the changing value of the window pane;

determining whether the change in the changing value of the window pane is consistent with the identified characteristic change of the changing value of a window pane entering the sealing area; and standardizing the window pane after it is determined that the change in the changing value of the window pane corresponds to the characteristic change in the changing value of the window pane entering the sealing area.

2. The method according to claim 1 wherein the value evaluated is one of a change in period length and speed of the drive or of a structural element movable by the drive when the window pane enters into the seal area.

3. The method according to claim 1 further comprising determining when the window pane enters into the seal area from a local extremum of a dynamic value correlated with the dynamics of the window pane in dependence on a displacement site of the window pane.

4. The method according to claim 3 wherein the local extremum determined is one of a period length and speed of the drive or of a structural element movable by the drive in dependence on the displacement site of the window pane.

5. The method according to claim 2 further comprising determining when the window pane enters into the seal area from a characteristic rise of a rising value correlated with the dynamics of the window pane.

6. The method according to claim 5 wherein the characteristic rise is one of a characteristic increase in the period length and a characteristic drop in the speed.

7. The method according to claim 1 further comprising interrupting the standardizing of the pane position if after a predeterminable time interval there is no observation of any path of the changing value correlated with the dynamics of the window pane which is characteristic for the window pane entering into the seal area.

8. The method according to claim 1 further comprising carrying out the standardizing of the pane position only when the window pane has moved at least along a path length which is greater than an extension of the seal area along a direction of movement of the window pane.

9. The method according to claim 8 wherein carrying out the standardizing of the pane position when the window pane has moved at least along a path length which is greater than the extension of the seal area along the direction of movement of the window pane includes a path which is required in order to reach a targeted displacement speed.

* * * * *